United States Patent [19]

McGrow et al.

[11] Patent Number: 5,213,693

[45] Date of Patent: May 25, 1993

[54] DEWATERING COMPOSITIONS AND PROCESSES

[75] Inventors: George McGrow; Peter I. Norman; Peter J. Hoyle, all of West Yorkshire, England

[73] Assignee: Allied Colloids Limited, Bradford, England

[21] Appl. No.: 770,244

[22] Filed: Oct. 3, 1991

[30] Foreign Application Priority Data

Oct. 4, 1990 [GB] United Kingdom ............... 9021565

[51] Int. Cl.$^5$ .............................................. C02F 11/14
[52] U.S. Cl. ..................... 210/728; 210/734; 210/735; 252/180
[58] Field of Search ............ 210/609, 725, 727, 728, 210/734, 735; 252/180

[56] References Cited

U.S. PATENT DOCUMENTS

| | | | |
|---|---|---|---|
| 3,321,649 | 5/1967 | Benedictis et al. | 210/728 |
| 3,509,021 | 4/1970 | Woodward | 210/728 |
| 3,951,792 | 4/1976 | Azorlosa et al. | 210/728 |
| 3,994,806 | 11/1976 | Rausch et al. | 210/728 |
| 4,588,508 | 5/1986 | Allenson et al. | 210/728 |
| 4,720,346 | 1/1988 | Flesher et al. | 210/734 |
| 4,835,206 | 5/1989 | Farrar et al. | 210/728 |
| 5,112,500 | 5/1992 | Jones et al. | 210/728 |

FOREIGN PATENT DOCUMENTS

0255283A1 2/1988 European Pat. Off. .
3820110 12/1989 Fed. Rep. of Germany .
53-41911 11/1978 Japan .

OTHER PUBLICATIONS

Japanese Abstract 62-57700, vol. 11, No. 251, Aug. 14, 1987.
Japanese Abstract 3-8498, vol. 15, No. 126, Mar. 27, 1991.

Primary Examiner—Peter Hruskoci
Attorney, Agent, or Firm—Dickstein, Shapiro & Morin

[57] ABSTRACT

Sewage sludge and other organic suspensions are prepared for filter press or belt press dewatering by substantially simultaneous treatment with a cationic coagulant polymer and a cationic flocculant polymer. A novel composition comprising a dry blend of the two polymers can then be formed to provide a combined solution for mixing with the suspension.

8 Claims, No Drawings

DEWATERING COMPOSITIONS AND PROCESSES

It is standard practice to facilitate the dewatering of an aqueous suspension by adding coagulant and/or flocculant to it. As used herein, the word "coagulant" describes a highly ionic low molecular weight material that achieves its effect primarily by absorbing on to the surface of the suspended particles and changing the surface charge on them, while the word "flocculant" describes a high molecular weight material that achieves its effect primarily by attaching to and bridging between adjacent suspended particles. The choice of suitable coagulant and flocculant materials depends upon the particular process and the particular suspension that is to be dewatered.

It has been known for many years that when dewatering sewage suspensions by many conventional processes, it is desirable to use a cationic polymeric flocculant having a molecular weight that is as high as is conveniently possible.

It is also well known that, prior to flocculating a suspension, it is often desirable to add a conditioning or coagulating agent. These materials can be inorganic polyvalent compounds such as alum or relatively low molecular weight cationic polymers. For instance, in JP-B-5133867 a process is described in which sewage sludge is treated with polyvalent metal salt, low molecular weight cationic polymer and high molecular weight cationic polymer. It is stated that the reagents may be added simultaneously but that it is better to add the high molecular weight polymer last. Pressure, gravity and vacuum filtration are mentioned. In comparative examples, the process consists solely of adding the low molecular weight cationic polymer and the high molecular weight cationic polymer.

In JP-B-5341911 a highly charged relatively low molecular weight polymer is added to activated sludge together with a higher molecular weight cationic polymer. Generally the higher molecular weight polymer is added after the low molecular weight polymer but in a comparison the high and low molecular weight polymers are added together. The suspension is then dewatered by centrifugal filtration or pressurised filtration.

In DE-A-3820110 a sewage sludge is dewatered by filter pressing. In one comparative example it is treated solely with polyvalent metal coagulant. In another comparative example it is treated solely by a high molecular weight (5 million) cationic copolymer of acrylamide and dimethylaminoethyl methacrylate that is supplied as a reverse phase emulsion. In the example of the invention, it is pre-treated with a low molecular weight (350,000) polymer of diallyl dimethyl ammonium chloride and is then treated with the high molecular weight polymer.

The conventional form in which the manufacturers supply the low molecular weight polymers mentioned in these citations is as aqueous solutions. The conventional way in which manufacturers supply high molecular weight polymers is in particulate form as powders (e.g., beads or crushed gel) or as reverse phase dispersions or emulsions. These particulate products conventionally have to be thoroughly dissolved in water before addition to the suspension that is to be treated.

These literature references clearly show the preference for adding the low and high molecular weight polymers sequentially, rather than simultaneously, and so they are teaching that the sewage plant must buy aqueous solution of low molecular weight polymer and a powder or dispersion of high molecular weight polymer, dissolve the latter into water, and then dose the solutions separately and sequentially into the suspension. The need to have two dosing points, and usually to have both liquids handling apparatus and solids handling apparatus is inconvenient but unavoidable if the processes of these specifications are to be followed.

In practice, however, the filter pressing or belt pressing of organic suspensions such as sewage tends to be conducted in a simpler, but unfortunately less effective, manner.

In the earliest processes, the only treatment was treatment with a polyvalent metal ion conditioner, such as alum or ferric chloride. It was realised many years ago that these processes could be improved by the use of organic polymers. In some instances relatively low molecular weight polymers were used, for instance homopolymers of quaternised dimethylaminomethyl acrylamide having intrinsic viscosity around 2 dl/g. Although this gave good dewatering and a relatively dry filter cake, the process was very expensive.

Accordingly the commercially preferred process involved the adoption of a single treatment using a conventional high molecular weight cationic flocculant polymer, typically intrinsic viscosity 6 to 8 dl/g. This greatly reduces the treatment costs and gives results that have been considered adequate. However if the doses are not controlled accurately, and if overdosing occurs, there is a tendency to form large gelatinous flocs which can release free water very quickly and cause blockage of feed holes, this effect being known as coring. Coring prevents full utilisation of the press chambers and so results in reduction in the volume of sludge that can be processed and it reduces the dry solids content of the resultant cake. Reducing the dose can permit better filling of the filter press but filterability is still inferior, leading to increased cycle time and reduced cake dry solids.

Another problem relates to the reduction in mixing intensity which occurs towards the end of the press cycle, as a result of the normal decline of sludge velocity through the sludge feed pump and delivery line. The conventional high molecular weight cationic polymers have a tendency to produce gelatinous sticky flocs, due to inefficient dispersion of the polymer, and this tends to result in the formation of a cake that does not release well from the filter press cloth and that has a wet centre, thereby again reducing cake dry solids.

It would be desirable to be able to minimise and preferably overcome these problems that are encountered during the dewatering of organic suspensions by filtration on a filter press or a belt press, and in particular it would be desirable to be able to overcome or minimise these problems using a very simple formulation that can be used in a simple manner.

In the invention, a suspension of organic solids is flocculated and is then dewatered by filtration on a filter press or belt press and the flocculation of the suspension is effected by substantially simultaneously distributing throughout the suspension dissolved cationic coagulant polymer that has intrinsic viscosity 0.2 to 3 dl/g and dissolved cationic flocculant polymer that has intrinsic viscosity above 5 dl/g, and allowing flocculation to occur.

We find that by providing both the coagulant polymer and the flocculant polymer in a form such that they are substantially simultaneously available to the suspension, we obtain a surprising improvement in results, as explained in more detail below.

Various ways of making the coagulant and flocculant polymers substantially simultaneously available (in solution) to the suspension can be used. For instance in PCT/GB91/00996 and in U.S. application Ser. No. 546,435 filed Jun. 29th 1990 (the disclosure of which is herein incorporated by reference) we describe processes in which coagulant beads can be added direct into a sewage suspension and dissolve very quickly into that suspension, and generally in those processes a solution of anionic flocculant is added subsequently. In the present invention, the coagulant beads and the solution of anionic flocculant could be added substantially simultaneously, in order that the coagulant dissolves and is made available to the suspension substantially simultaneously with the dissolved flocculant being made available to the suspension.

Preferably, however, in the invention the flocculation is conducted by substantially simultaneously mixing into the suspension the cationic coagulant polymer as a preformed solution and the cationic flocculant polymer as a preformed solution, and most preferably as a single preformed solution containing both the cationic coagulant polymer and the cationic flocculant polymer.

In one aspect according to the invention, a novel composition comprises a water soluble, particulate mixture of cationic coagulant polymer having intrinsic viscosity about 0.2 to about 3 dl/g and cationic flocculant polymer having intrinsic viscosity of at least 5 dl/g.

A method according to this, preferred, aspect of the invention for flocculating a suspension of organic suspended solids comprises dissolving the described particulate mixture in water to form a treatment solution, mixing the treatment solution with the suspension and thereby flocculating the suspension, and dewatering the flocculated suspension by filtration on a filter press or belt press.

The intrinsic viscosity of the coagulant polymer is generally at least about 0.5 dl/g and preferably is at least around 0.8 dl/g. Preferably it is not more than around 2.4 dl/g, and good results are obtained with values below 2 dl/g. Expressed in terms of molecular weight, this will normally be below 3 million, generally below 2 million and preferably below 1.5 million, and it should generally be above 100,000 and preferably above 500,000.

Throughout this specification, molecular weights are the values obtained by gel permeation chromatography and intrinsic viscosities are the values obtained using a suspended level viscometer at 25° C. in 1 molar sodium chloride aqueous solution buffered to pH 7.0.

The coagulant polymer can be a low molecular weight, rapidly dissolving, highly ionic, naturally occurring polymer but generally it is a synthetic polymer formed by polymerisation of a water soluble ethylenically unsaturated monomer or blend of monomers and has a high cationic charge density. Accordingly it is preferred for at least 50%, and generally at least 80%, of the monomers from which it is formed to have a cationic charge. Although the polymer can be amphoteric, preferably all the ionic monomers are cationic. Although polymers in which 100% of the monomers are cationic are preferred, if non-ionic monomer is present its amount is generally below 50%, and preferably below 20% by weight. Any of the non-ionic, ethylenically unsaturated, water soluble monomers that are conventionally present in polymeric ionic coagulants can be used, but (meth) acrylamide is preferred. It is generally best for the polymer to be a homopolymer of cationic monomer.

Preferred cationic monomers are dialkylaminoalkyl (meth) -acrylates and -acrylamides, generally as acid addition or quaternary ammonium salts, and diallyl dialkyl ammonium halides. The preferred acrylates and methacrylates are preferably di-$C_{1-4}$ alkylaminoethyl (meth) acrylates and the preferred acrylamides are di-$C_{1-4}$ alkylaminopropyl (meth) acrylamides, in particular dimethylaminoethyl (meth) acrylate and dimethylaminopropyl (meth) acrylamide (with the respective acrylate and methacrylamide compounds being particularly preferred) as acid addition and quaternary ammonium salts. For most purposes the most suitable cationic monomer is a diallyl dialkyl quaternary salt, preferably dimethyl ammonium chloride. Generally a single cationic monomer is used, but if desired a copolymer may be formed, for instance from diallyl dimethyl ammonium chloride and dimethylaminopropyl methacrylamide salt, generally with the latter in a minor proportion.

Instead of forming the coagulant polymer by addition polymerisation of ethylenically unsaturated monomers, any other known ionic coagulant polymers can be used. For instance suitable polymers are polyethylene imine and polyamines, e.g., as made by condensation of epichlorhydrin with an amine. Other polymers include aminomethylolated polyacrylamide (free base or quaternary or acid salt), poly (2-hydroxypropyl-1-N-methylammonium chloride), poly (2-hydroxy-propyl-1, 1-N-dimethylammonium chloride, and poly (2-vinylimidazolinum bisulphate.

Particularly preferred coagulant polymers for use in the invention are polymers of diallyl dimethyl ammonium chloride (DADMAC), generally as homopolymers but optionally with up to 20% of other monomer, generally acrylamide, having IV of about 0.6 to 3, most preferably around 0.8 to 2.5 dl/g. Preferably IV is above about 1.3 or 1.5 dl/g.

The flocculant polymer preferably has intrinsic viscosity at least 6 dl/g, often at least 8 dl/g. Typically it is up to 15 dl/g, but in some instances it can be higher. Expressed in terms of molecular weight, this is typically at least 5 million.

The polymer can be a high molecular weight natural or modified natural cationic polymer but preferably it is a synthetic polymer formed from one or more of the water soluble ethylenically unsaturated monomers listed above. It is generally preferred for the polymer to be formed from a blend of cationic and non-ionic monomers, with the blend typically being formed from 8 to 50 mole percent, most preferably 15 to 40 mole percent, cationic monomer with the balance non-ionic monomer.

Particularly preferred polymers are copolymers of (meth) acrylamide with the quaternary or acid salts of dialkylaminoalkyl (meth) -acrylamides or -acrylates, especially the quaternised dimethyl or diethyl aminoethyl (meth) acrylates.

The particulate composition can be a reverse phase emulsion containing both polymers or, more preferably, can be a reverse phase dispersion containing both polymers, i.e., a dispersion that is substantially dry. The particle size in such dispersions and emulsions is below 10 μm and they are normally stabilised by the presence therein of an amphipathic polymeric stabiliser. They may include an oil-in-water emulsifier to promote distribution into water to form the treatment solution.

Preferably however the particulate composition is a dry particulate solid. It is possible to form particles containing both types of polymer, for instance as a result of drying a film of a solution of the mixed polymers and then flaking the film, but preferably the composition is formed by mixing particles of the coagulant polymer with particles of the flocculant polymer.

The particles are preferably substantially bead shaped, for instance as made by reverse phase suspension polymerisation. Reverse phase suspension polymerisation typically comprises dispersing beads of aqueous monomer in a water immiscible liquid, generally in the presence of amphiphilic polymeric stabiliser, polymerisation within the beads, drying by azeotropic distillation and then separation of the beads from the liquid, often followed by further drying. Suitable methods and materials are well known and are described in, for instance, U.S. Pat. Nos. 2,982,749, 4,506,062 and 4,528,321. The bead size is typically in the range 70 to 1000 µm, often 100 to 500 µm.

Other solid particulate forms can be used, preferably within the same size ranges. For instance, a solution of a polymer can be drum dried or otherwise dried as a film which canthen be converted into flakes. If the polymer itself has characteristics such that it is difficult to provide it in the form of solid particles that can be handled without, for instance, caking, then the particles can be formed of a mixture of a carrier (that promotes formation of particles) and the polymer. For instance a polymer can be distributed throughout beads of a matrix material that will liberate the polymer rapidly upon contact with water, for instance as a result of disintegration of the matrix in water. A suitable matrix material is a carbohydrate, for instance starch, or an inorganic carrier material. The blend can be made as in, for instance, EP-A-188489. Preferably however the polymer particles consist solely of the desired polymer.

Suitable coagulant polymers are available in bead form from Allied Colloids Limited under the trade names Magnafloc 368 and Percol 368 (cationic polydiallyldimethyl ammonium chloride).

A variety of suitable cationic flocculant bead polymers are available from Allied Colloids Limited, for instance the products sold under the trade names Zetag 63 and Zetag 57 and Percol 763 and Percol 757.

The preferred compositions of the invention are blends of bead form polydiallyl dimethyl ammonium chloride homopolymer or copolymer with up to 30 mole % acrylamide and having IV of 0.5 to 3 dl/g and bead form copolymers of dialkylaminoethyl (meth) acrylate quaternary or acid salt copolymerised with 50 to 90 mole percent acrylamide and having IV of 6 to 15 dl/g.

The amount by weight of coagulant polymer, per part by weight of the flocculant polymer, is generally at least 0.1 parts and usually at least 0.5 parts, with best results generally being obtained when it is at least 0.7 parts. It can be as high as, for instance, 10 parts but best results are generally obtained with less than 5 parts, preferably less than 2 parts.

When the composition is formed of beads or other particles of both types of polymer, it is preferred that each polymer should be of similar particle size, since if the beads are mixed initially, they will tend to stay as a substantially uniform mixture and this will facilitate uniform dosing of the polymers into the treatment solution.

The blended particulate composition should be dissolved in water to form the desired treatment solution by a method suitable for the dissolution of high molecular weight cationic flocculant polymer. The solution is usually allowed to stand to achieve full dissolution. It is then dosed into the dispersion from a single dosage point in conventional manner. The treatment solution can have a concentration of, for instance, 0.05 to 0.5% total polymer, and the total polymer dose to the suspension typically is in the range 0.1 to 1%, based on total dry solids of the suspension. The suspension generally comprises municipal or other sewage sludge.

The invention provides a combination of two significant advantages. The first advantage is the ease of using the composition. Thus a single dry composition can be supplied to the user and this can be dissolved at a single make-up unit and dosed at a single dosage point.

Combined with this is the fact that the single composition gives results superior to those that are obtained whenever either of its components is used alone, and this is surprising in view of the inferences in the literature that the coagulant and flocculant polymer solutions should preferably be made up separately and dosed sequentially.

Compared to the processes using the low molecular weight polymer alone, the method of the invention gives a much more cost-effective treatment.

Compared to the traditional methods using the high molecular weight flocculant alone, the method of the invention gives numerous advantages. The flocs are small, evenly structured and highly filterable and have good shear stability, and the system is relatively resistant to overdosing. Thus the risk of the formation of gelatinous flocs with the consequential disadvantages of coring and reduced productivity can be avoided. In particular, higher cake dry solids can be obtained, again because of the better floc structure. The process is also less susceptible to underdosing, which previously would have led to poor filterability and longer cycle times. Thus, overall, the process can give reduced cycle time, drier cake, better utilisation of the capacity of the filter or belt press, improved filtrate quality, better cake release from the cloth, and cleaner filter cloths.

These are all important advantages and in view of the suggestions in the above-mentioned prior art that it is preferred to dose coagulant and flocculant polymers sequentially into the suspension it is surprising that they can be obtained from dosage of the two polymers at a single dosage point.

Compared to the processes that use coagulant and flocculant polymers in sequence, the invention has the great advantage that, for the first time, the polymers can be supplied as a single blended dry mix and thus they have the great advantage of only requiring a single type of handling apparatus, a single make-up apparatus and a single dosage point. It is surprising that the described performance advantages can be obtained in this manner, in view of the suggestions in the literature that coagulant and flocculant polymers should be dosed sequentially.

As indicated, best results are obtained when the coagulant polymer is DADMAC homopolymer or copolymer. Although best results are obtained when this is supplied as a particulate pre-mix with the flocculant polymer, it is new and advantageous to dose the dissolved poly DADMAC and the dissolved flocculant polymer substantially simultaneously into the dispersion, irrespective of how the polymers are initially supplied.

Accordingly, in a second aspect of the invention, a suspension of organic suspended solids is flocculated by providing a solution of a coagulant homopolymer or copolymer of DADMAC having IV 0.2 to 3 dl/g, providing a solution of a cationic flocculant polymer having IV at least 5 dl/g, and adding the solutions either as a blended solution or substantially simultaneously to the suspension and thereby flocculating the suspension, and dewatering the flocculated suspension by filtration on a filter press or belt press.

By saying that we add the solutions substantially simultaneously we mean that if they are being added to a flowing suspension (as is usual), they are added at a single addition point or at closely adjacent addition points in the flow line.

Preferably the solution of coagulant polymer is provided by dissolving solid particulate polymer in water, e.g., beads.

In all aspects of the invention, preferably the coagulant polymer has IV above 0.8 dl/g and often 1 or more, e.g., 1.3 to 1.5 up to around 3 dl/g. It is particularly preferred that the coagulant polymer having this high molecular weight should be a bead form of a DADMAC copolymer or homopolymer, preferably a substantial homopolymer. Molecular weight is often above 0.5 million and frequently even above 0.8 million. It is surprising that the use of these DADMAC polymers simultaneously with the flocculant polymers gives such good results. The prior art recommends sequential treatment using much lower molecular weight, generally different, coagulant polymers.

The following is an example.

Cationic poly DADMAC in bead form of IV about 1 dl/g (Magnafloc 368 from Allied Colloids Limited) was blended with an equal weight of a bead form cationic flocculant polymer having intrinsic viscosity about 8 dl/g and formed from 58% by weight acrylamide and 42% by weight methyl chloride quaternised dimethyl-aminoethyl acrylate. The bead size of each polymer was approximately the same and was in the range 100 to 500 μm.

This blend was dissolved in a conventional make-up unit over a period of at least one hour to form a treatment solution, and this solution was then dosed at a municipal sewage works into a digested primary/activated/humus sludge at a dosage of about 4 kg per ton dry solids sludge. The resultant suspension was forced by three ram-type piston pumps into a 3 chamber filter press. The press cycle was terminated after 2¼ hours. The resultant cakes ranged in dryness from 32 to 38% dry solids. All chambers of the press were perfectly filled and the cake release was very good despite dirty cloths having been used on the presses.

As a comparison, when the high molecular weight polymer was used alone at 4 to 5 kg per ton dry solids, the press cycles were 3 to 5 hours and the cakes ranged in dryness from 28 to 30% dry solids. Any attempt at increasing cake solids by increasing the dose of the polymer merely resulted in coring, i.e., incomplete filling of the presses.

We claim:

1. A process in which a suspension of organic solids is flocculated and is then dewatered by filtration on a filter press or belt press, the process comprising providing a water-soluble particulate mixture of (a) beads of cationic coagulant polymer, wherein said coagulant polymer is selected from polyethylene imine, polyamines, aminomethylolated polyacrylamide, poly 2-hydroxypropyl-1-N-methylammonium chloride, poly 2-hydroxy-propyl-1, 1-N-dimethylammonium chloride, poly 2-vinylimidazolinum bisulphate and polymers formed by polymerisation of water soluble ethylenically unsaturated monomer comprising at least 50% by weight cationic monomer selected from dialkylaminoalkyl (meth) acrylate, dialkylaminoalkyl (meth) acrylamide and diallyl dialkyl quaternary salt, and said coagulant polymer having intrinsic viscosity about 0.2 to about 3 dl/g, and wherein the beads have been made by reverse phase suspension polymerization and have a size in the range of 70 to 1000 microns and (b) separate beads of cationic flocculant polymer, wherein said flocculant polymer is a synthetic polymer formed by polymerisation of water soluble ethylenically unsaturated monomer comprising cationic monomer selected from dialkylaminoalkyl (meth) acrylamide and dialkylaminoalkyl (meth) acrylate and said flocculant polymer having intrinsic viscosity above about 5 dl/g, and wherein the beads have been made by reverse phase suspension polymerization and have a size in the range of 70 to 1000 microns, said coagulant polymer being present in an amount of 0.1 to 10 parts per part by weight flocculant polymer, dissolving into water said particulate mixture and thereby forming a solution of the cationic coagulant polymer and the cationic flocculant polymer, mixing a flocculation effective amount of said solution into the suspension and thereby simultaneously distributing throughout the suspension the dissolved cationic coagulant polymer and the dissolved cationic flocculant polymer, allowing flocculation to occur, and dewatering the flocculated suspension by filtration on a filter press or belt press.

2. A process according to claim 1 in which the coagulant polymer has intrinsic viscosity about 0.8 to about 2.4 dl/g and the flocculant polymer has intrinsic viscosity of at least 6 dl/g.

3. A process according to claim 1 in which the coagulant polymer is formed from 50 to 100% cationic monomer and 0 to 50% non-ionic monomer wherein the cationic monomer is selected from dialkylaminoalkyl (meth) acrylates, dialkylaminoalkyl (meth) acrylamides (as acid addition or quaternary ammonium salts) and diallyl dialkyl quaternary salts.

4. A process according to claim 1 in which the flocculant polymer is a copolymer of 8 to 50 mole percent cationic monomer and 50 to 92% non-ionic monomer wherein the cationic monomer is selected from dialkylaminoalkyl (meth) acrylamides and dialkylaminoalkyl (meth) acrylates, as quaternary ammonium or acid addition salts.

5. A process according to claim 1 in which the organic suspension comprises sewage sludge.

6. A process in which a suspension of organic solids is flocculated and is then dewatered by filtration on a filter press or belt press, the process comprising providing a water-soluble particulate mixture of (a) beads of cationic coagulant polymer that has intrinsic viscosity about 0.2 to about 3 dl/g wherein the beads have been made by reverse phase suspension polymerization of 80 to 100% diallyl dimethyl ammonium chloride and 0 to 26% non-ionic monomer and have a size in the range of 70 to 1000 microns and (b) separate beads of cationic flocculant polymer, said flocculant polymer being a copolymer of 8 to 50 mole percent cationic monomer and 50 to 92% non-ionic monomer wherein the cationic monomer is selected from dialkylaminoalkyl (meth) acrylamides and dialkylaminoalkyl (meth) acrylates, as quaternary ammonium or acid addition salts, and said flocculant polymer having intrinsic viscosity above about 5 dl/g, and wherein the beads have been made by reverse phase suspension polymerization and have a size in the range of 70 to 1000 microns, said coagulant polymer being present in an amount of 0.5 to 5 parts per part by weight flocculant polymer, dissolving into water said particulate mixture and thereby forming a solution of the cationic coagulant polymer and the cationic flocculant polymer, mixing a flocculation effective amount of said solution into the suspension and thereby simultaneously distributing throughout the suspension the dissolved cationic coagulant polymer and the dissolved cationic flocculant polymer, allowing flocculation to occur, and dewatering the flocculated suspension by filtration on a filter press or belt press.

7. A process according to claim 6 in which the coagulent polymer has intrinsic viscosity from about 1 to about 3 dl/g.

8. A process according to claim 6 in which the organic suspension comprises sewage sludge.

* * * * *